C. RUSSELL.
Car Spring.
No. 39,310.  Patented July 21, 1863.
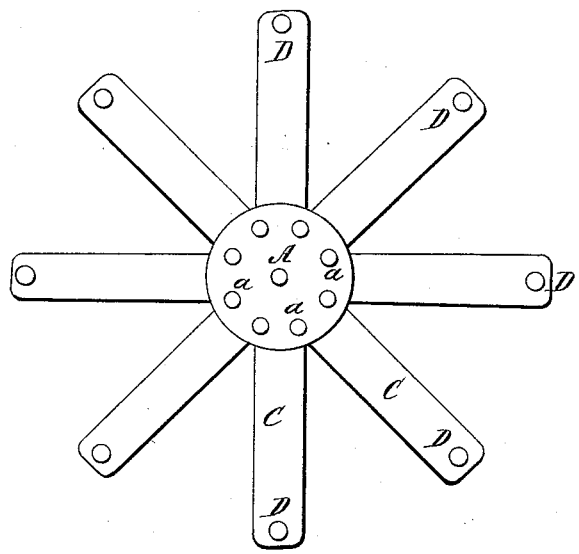
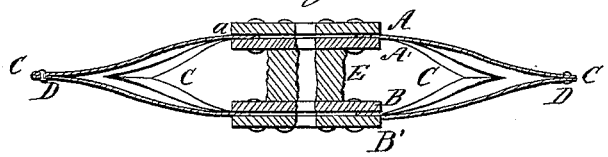
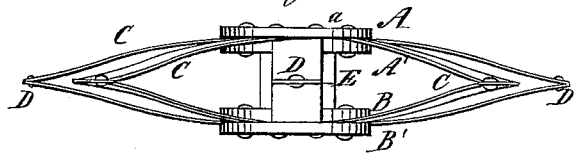
Witnesses:  Inventor:

UNITED STATES PATENT OFFICE.

CLEMENT RUSSELL, OF MASSILLON, OHIO.

IMPROVEMENT IN RAILROAD-CAR SPRINGS.

Specification forming part of Letters Patent No. 39,310, dated July 21, 1863.

*To all whom it may concern:*

Be it known that I, C. RUSSELL, of Massillon, in the county of Stark and State of Ohio, have invented new and useful Improvements in Railroad-Car Springs; and I do hereby declare that the following is a full and complete description of the construction and operation of the same, reference being had to the accompanying drawings, making part of this specification, in which—

Figure 1 is a top view. Fig. 2 is a vertical section, and Fig. 3 is a side view.

Like letters refer to like parts.

My invention relates to a compound radiating elliptical and gum-elastic spring for railroad-cars and other heavy vehicles. The construction thereof is as follows: A A' and B B' represent pairs of iron disks from four to six inches in diameter and half an inch or more in thickness. Each pair has a hole in the center, as seen in Figs. 1, 2, and 3, through which passes a steady-pin to keep the spring in place. Between each pair of disks is secured the ends of eight pairs of elliptical springs, C, which radiate from the center of the disk, as seen in Fig. 1. Each pair of springs are riveted together at the outer ends, as shown at D. The inner ends of each pair are secured between the plates A A' and B B', respectively, by screw-bolts that pass through the springs and edges of the disks, in which position they are firmly held, as shown at *a*. The leaves of the springs are so bent and formed as to keep the disks A' and B' about four inches apart when not under pressure, and between these plates I insert a short cylinder of vulcanized rubber, E, of sufficient length to fill the space between the pairs of disks. The diameter of the rubber cylinder is about two-thirds that of the disks, and is held firmly in place by the pin which passes through the center of the disks.

I have found from experiment that springs constructed as above described, without the rubber, become broken very soon, and are of no practical use; but with the addition of the rubber cylinder between the disks, as above described, the sudden concussion of the spring is prevented by the rubber, and the rubber in turn is prevented from being crushed by the action of the steel springs, so that the rubber and steel springs mutually support each other. The small quantity of rubber used would be of no service if used alone, as it would soon be crushed; but when the rubber and steel springs, as above described, are used in combination, a very valuable compound spring is the result.

What I claim as my improvement, and desire to secure by Letters Patent, is—

The rubber cylinder E, in combination with the disks A A' and B B' and radial elliptical springs C, when these several parts are constructed and arranged substantially as and for the purpose specified.

CLEMENT RUSSELL.

Witnesses:
W. H. BURRIDGE,
P. A. BRINK.